United States Patent [19]
Voege

[11] Patent Number: 5,577,955
[45] Date of Patent: *Nov. 26, 1996

[54] PORTABLE TILE SAW SHIELD

[76] Inventor: Richard E. Voege, 2560 Jacob St., Hayward, Calif. 94541

[ * ] Notice: The term of this patent shall not extend beyond the expiration date of Pat. No. 5,457,915.

[21] Appl. No.: 543,384

[22] Filed: Oct. 16, 1995

Related U.S. Application Data

[63] Continuation-in-part of Ser. No. 6,368, Jan. 19, 1993, Pat. No. 5,457,915.

[51] Int. Cl.[6] ............................ B23Q 11/08; B23D 47/00
[52] U.S. Cl. .................................... 451/455; 451/451
[58] Field of Search ........................ 451/455, 451; 144/252 R; 125/13.03, 11.22; 51/266, 667, 268, 272

[56] References Cited

U.S. PATENT DOCUMENTS

| | | | |
|---|---|---|---|
| 2,491,957 | 12/1949 | Dilley | 160/351 |
| 2,714,926 | 8/1955 | Nichta | 160/191 |
| 2,766,561 | 10/1956 | Carlson . | |
| 2,867,064 | 1/1959 | Hermansson | 51/272 |
| 3,183,629 | 5/1965 | R. Ver Meulen | 451/455 |
| 3,824,890 | 6/1972 | Zettler et al. | 90/11 R |
| 4,077,161 | 3/1978 | Wyle et al. | 51/98 R |
| 4,423,568 | 1/1984 | Gould | 451/455 |
| 4,484,845 | 11/1984 | Pennella, Jr. et al. | 451/455 |
| 4,543,021 | 9/1985 | Adler | 451/455 |
| 4,578,907 | 4/1986 | Cayley et al. | 51/268 |
| 4,811,527 | 3/1989 | Ruopsa | 51/270 |
| 4,910,925 | 3/1990 | Longuet | 51/272 |
| 5,457,915 | 10/1995 | Voege | 451/455 |

*Primary Examiner*—D. S. Meislin
*Assistant Examiner*—Eileen P. Morgan
*Attorney, Agent, or Firm*—Thomas M. Freiburger

[57] ABSTRACT

A plastic shield for a tile saw includes two vertical side panels, a back panel and a top panel, which in one embodiment are dismantlable separate panels. The components are quickly assembled together via slotted edges or connecting extrusions and when dismantled stack flatly within the water tray which is included as part of the tile saw apparatus. The tile saw shield is configured to allow normal use of the tile saw, without encumbering the user. It contains water from spraying out of the tray, to the extent that the tile saw can be used in an interior setting. In a second embodiment the shield is made of a single, integral piece of relatively rigid sheet material, such as "corrugated" plastic material, with fold lines enabling the shield to be erected by folding. Tabs and slots secure the shield together, without fasteners.

16 Claims, 5 Drawing Sheets

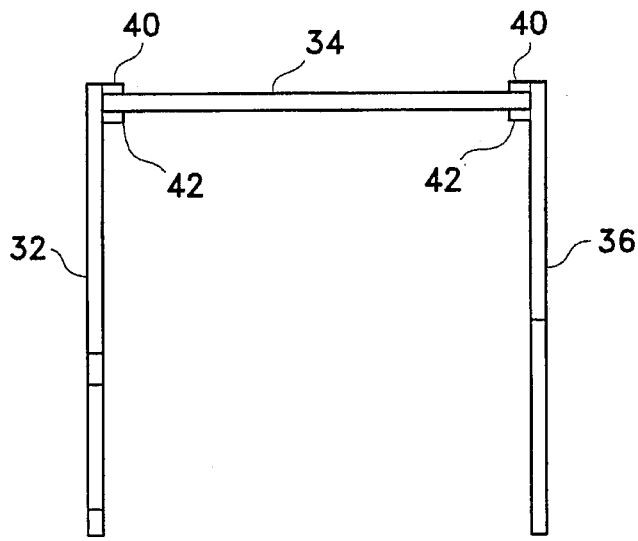
Fig. 7
Fig. 8
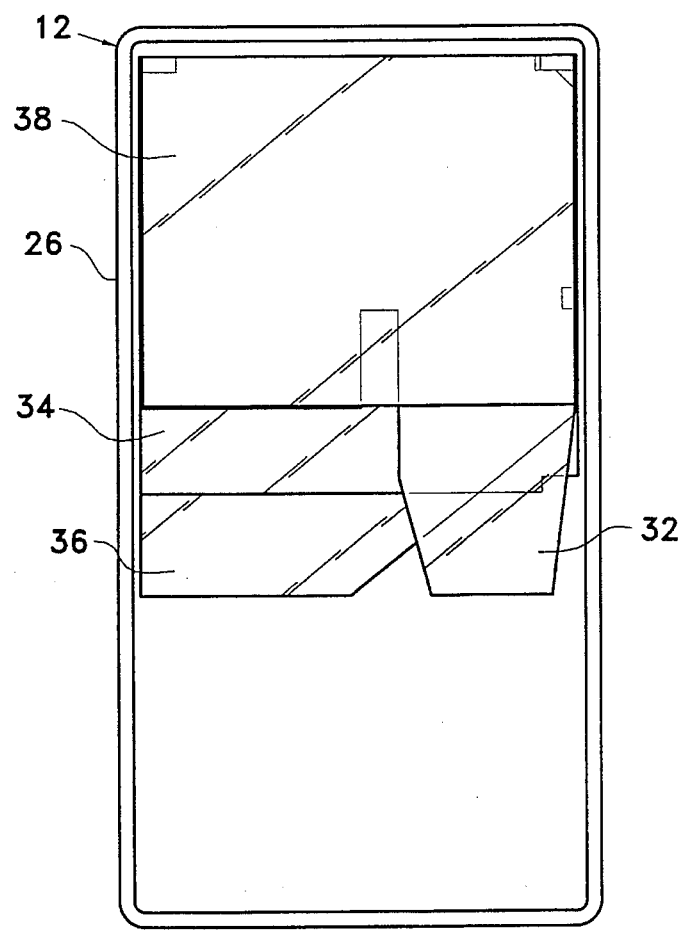
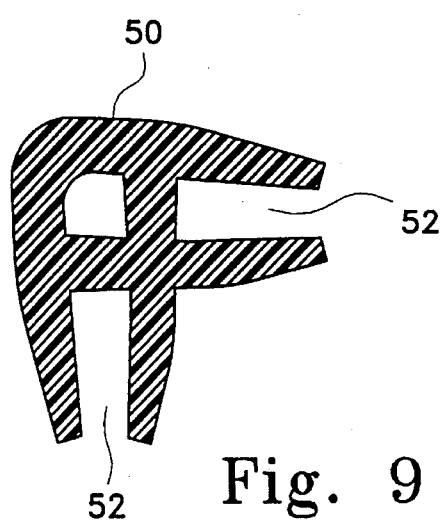
Fig. 9

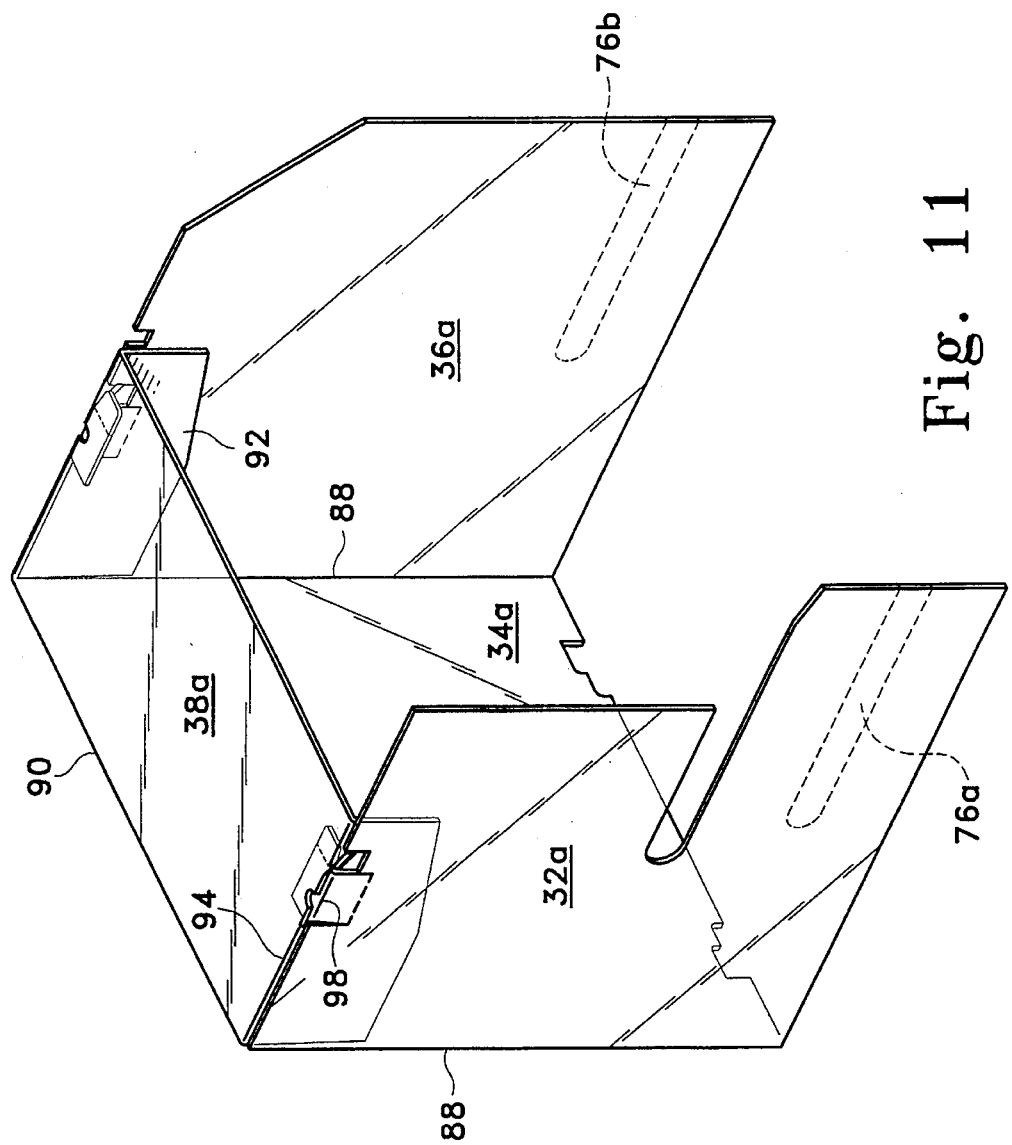
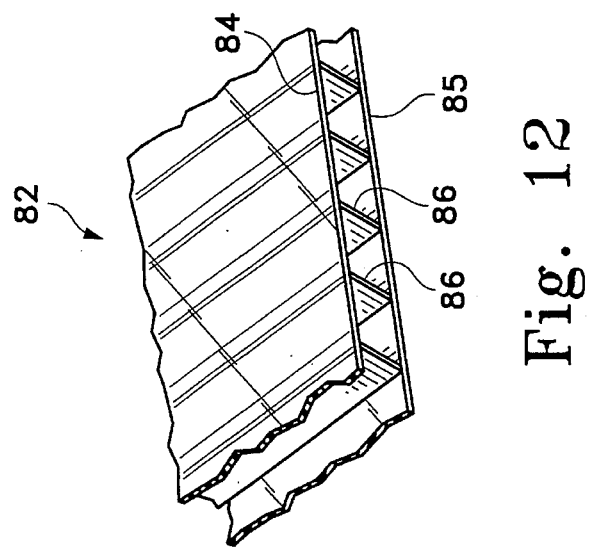

PORTABLE TILE SAW SHIELD

This is a continuation-in-part of application Ser. No. 6,368, filed Jan. 18, 1993, now U.S. Pat. No. 5,457,915.

BACKGROUND OF THE INVENTION

The invention relates to tile saws, and more specifically the invention is concerned with a containment device for the spray of water from a tile saw, which normally prevents the saw equipment from being used in the interior of an interior setting.

Shields of various types have been well known, for a number of items of power equipment. For example, see U.S. Pat. Nos. 4,910,925, 4,811,527, 4,578,907, 4,077,161, 3,824,890, 3,183,629, 2,867,064, 2,766,561, 2,714,926 and 2,491,957.

Of the above patents, Ver Meullen U.S. Patent No. 3,183,629 discloses a shield structure comprised of wall panels which are removable, the shield being applied to a belt grinder. Hermansson U.S. Pat. No. 2,867,064 discloses a splash guard involving a movable transparent panel. The splash guard is designed for machine tools and does not encompass the features and advantages of the present invention.

None of the above referenced patents shows a collapsible transparent tile saw shield having the features of the present invention described below. Moreover, nothing in the prior art shows a splash guard or shield for a tile saw, enabling the tile saw to be used indoors without damage to surrounding furniture, floors, etc.

SUMMARY OF THE INVENTION

In accordance with the present invention, a shield for a tile saw includes a plurality of panels, preferably transparent, which are assembled to rest within the tray of the tile saw. Typically a tile saw includes a water-containment tray with a shallow peripheral rim or wall. Left side, right side and back panels of the tile saw shield rest in the tray, just inside the peripheral lip, and are retained together by suitable edge securement means. A top panel completes the assembly, again being connected to the other three panels by an appropriate edge attachment. Thus, the four panels of the tile saw shield are easily erected and quickly dismantlable. When dismantled, the panels stack flatly and compactly within the water tray of the tile saw apparatus, from which the motor/saw blade assembly is typically removed for transport. Thus, the panels are contained in a component which would otherwise be empty.

The erected shield of the invention effectively contains water from spraying out of the tray during use, to the extent that the tile saw apparatus can be used in an interior setting. Thus, an operator, when on a job such as an apartment above the ground floor, is not required to travel back and forth to an outdoor location of the tile saw, as is often required in conventional practice. The invention also allows work to continue in bad weather.

The tile saw shield is configured to allow normal use of the tile saw, without encumbering the user or the range of motion of the tile saw's tile cutting platform. The only exception is that the shield does not allow 12 inch tile to be cut because it prevents tile from hanging out over the tray's side edges. However, 12 inch tile will drip water on the floor and should be cut outdoors in any event, so that no real limitation is imposed.

Accordingly, in one embodiment the present invention comprises a shield apparatus for a tile saw which has a tray carrying a liquid bath and having a motor driven cutting blade over which the liquid passes, the shield being positioned to substantially prevent liquid from spraying or splashing out from the tile saw and beyond the tray. The shield includes a plurality of portable panels, with a back panel, left and right side panels and a top panel. These panels include connection means for retaining adjacent edges of the panels together in a generally rectangular arrangement of the panels, cooperating with the location of the panels just inside the lip or peripheral wall of the tray to retain the shield in place in the tray. The panel connection means include means for quickly erecting and quickly disconnecting the panels from each other. Further, each panel is of a size and shape such as to readily stack and fit flatly in the tray when disconnected from the other panels, for compact storage and transport.

In a preferred embodiment, all of the panels are of substantially transparent plastic material. They may be of acrylic material, such as the acrylics sold under the trademarks Lucite and Plexiglas. They may also be of polycarbonate material (as sold under the trademark Lexan, or any other transparent material having similar properties, preferably with some scratch resistance.

In one specific embodiment of the invention, the panel connection means comprises grooves formed adjacent to the edges of some of the panels, for receiving the edge of an adjacent panel in generally rectangular orthogonal relationship. Another preferred panel connection means is the use of extruded strips having two channels at right angles, for receiving edges of the panels. Preferably the side and top panels are of sizes to extend not to the front of the tray, but leaving space for an operator to conveniently operate the tile saw. For some configurations of tile saw, at least one of the side panels may be required to include a cut out area to accommodate support structure or other tile saw structure.

Hinging could alternatively be used for some of the connections (three maximum), with appropriate edge connection used for the remaining edge connections. The hinges (not shown) must be positioned and configured so as to allow the panels, when broken apart, to stack relatively flatly.

A further embodiment is disclosed with integral hinges in a one-piece, lightweight and more economically produced tile saw shield of the invention. Such a tile saw shield may be advantageously formed of corrugated plastic material, about ⅛ inch thick, having benefits of strength, toughness, light weight and low cost. More quickly erectable and dismantlable, without fasteners, the "corrugated" plastic shield folds flatly and compactly. Although in a storage configuration it may not fit into the tray of the tile saw, it can be stored very compactly and resists scratching, so that it is fully as convenient as the other embodiment in transport and storage.

It is therefore among the objects of the invention to provide a conveniently usable, quickly erectable and dismantlable shield apparatus for use with a tile saw, with the dismantled shield comprising separate panels which in one embodiment can be stored in the water tray of the tile saw apparatus itself. These and other objects, advantages and features of the invention will be apparent from the following description of a preferred embodiment, considered along with the accompanying drawings.

DESCRIPTION OF THE DRAWINGS

FIG. 7 is a top plan view schematically showing one form of edge assembly which may be used to retain the panels together.

FIG. 8 is a top plan view showing a tray of the tile saw apparatus, with the disassembled shield panels stacked in the tray.

FIG. 9 is a sectional view showing an extrusion which may be used to secure the shield panels edge-to-edge, as an alternative to the configuration shown in FIG. 7.

FIG. 11 is a perspective view showing the foldable tile saw shield of FIG. 10 folded and secured together as an erected tile saw shield.

FIG. 12 is a fragmentary detail view showing a small portion of corrugated plastic material from which the tile saw shield of FIGS. 10 and 11 may be formed.

DESCRIPTION OF PREFERRED EMBODIMENTS

Figure 1:
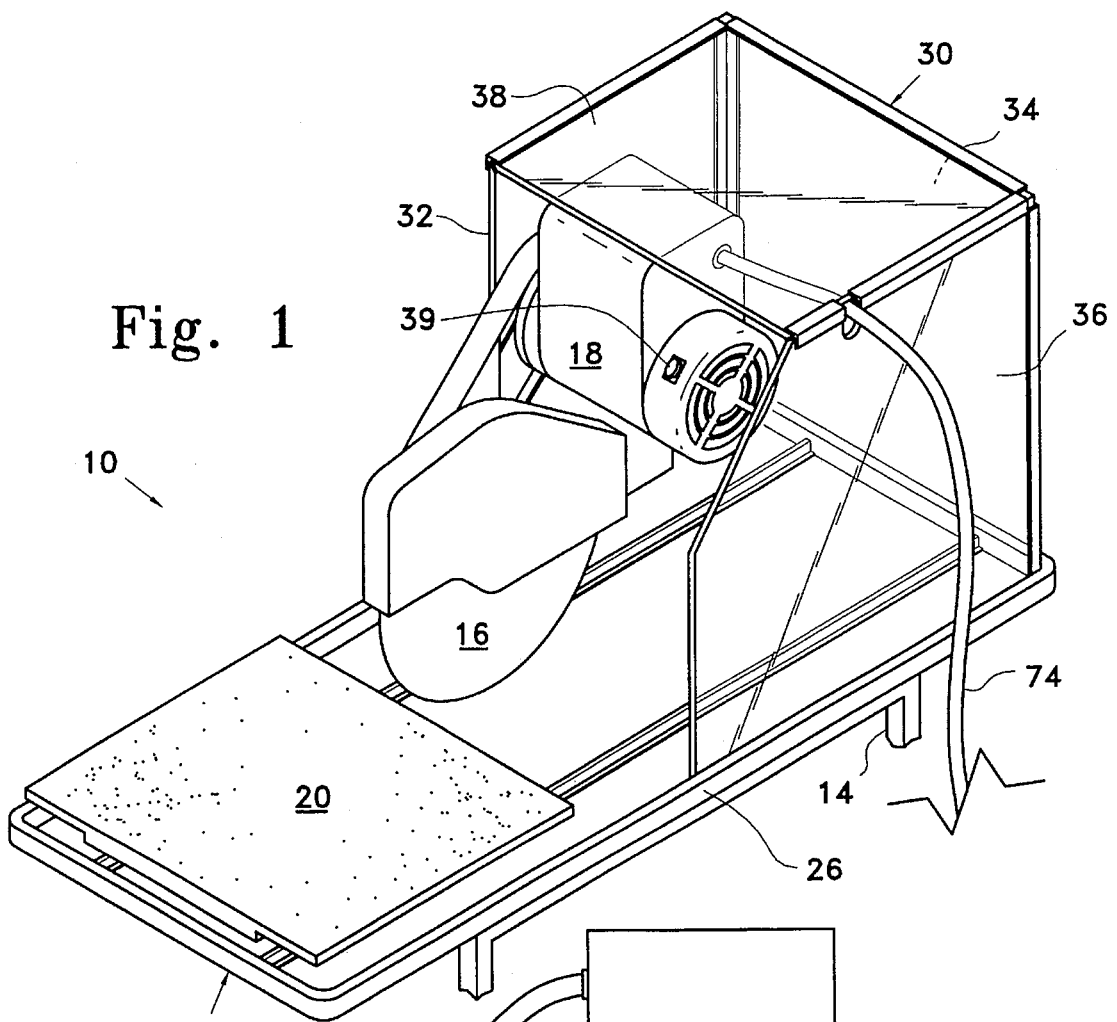
FIG. 1 is a perspective view showing a tile saw apparatus fitted with a tile saw shield according to the invention.
Figure 2:
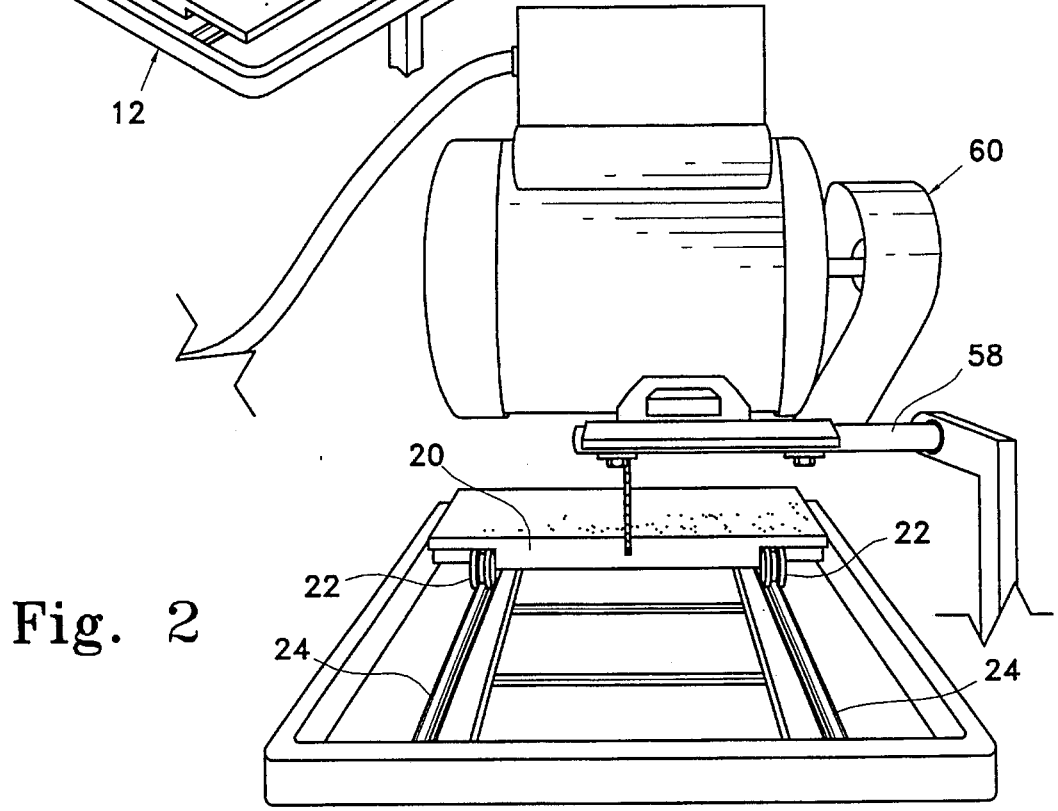
FIG. 2 is a rear elevation view of a tile saw apparatus, without the shield.

FIG. 1 shows a conventional tile saw apparatus generally identified as 10, with a liquid bath tray 12, a support stand or frame 14, a bearing-mounted tile saw blade 16, driven by a motor 18, and a movable carriage or stage 20 which is slidable forward and back under the blade 16 to cut tiles. As shown in FIG. 2, the movable stage 20 has rollers 22 which ride on tracks or rails 24, one on each side of the tray 12. The tracks 24 form an integral or permanently fixed part of the tray 12 in a conventional tile saw.

To use the tile saw apparatus 10, the operator places a tile, such as a ceramic tile, on the slidable stage 20, with the stage in a forward position relative to the saw blade 16, i.e. a position nearer the operator. With the saw blade rotating, the stage is pushed toward the back of the apparatus so that the tile is cut by the diamond-tipped saw blade, in a line parallel to the carriage tracks 24. The purpose of the tray 12, which has a lip or wall 26 around its perimeter, is to carry a bath of liquid (preferably water) which is constantly fed against the blade for cooling and lubrication as the cutting progresses. The feeding of the water to the blade is accomplished by a small electric pump (not shown) which draws water from the bath and delivers it via a tube (not shown) against the blade so that the cutting edge of the blade is always wet during the cutting operation.

FIG. 1 also shows a tile saw shield of the invention, generally identified as 30, secured in place on the tile saw apparatus 10. The illustrated tile saw 10 is of one specific type in common use, i.e. a Tile Master Model TM-1 tile saw manufactured by Felker Operations division of Federal-Mogul Corporation. U.S. Pat. No. 3,635,206 describes the slidable water tray of such a tile saw. However, the principles of the invention apply to tile saws in several different typical configurations.

As illustrated, the tile saw shield includes a left side panel 32, a back panel 34, a right side panel 36 and a top panel 38. The top panel 38 is shorter in length or depth than the side panels, extending approximately to the front of the motor 18, to allow easy access to a power switch 39 typically mounted at the front of the motor. These panels rest in the tray 12, just inside the lip or wall 26 of the tray as shown in FIG. 1. The four panels 32–38 preferably are of transparent plastic material which may be acrylic sheet material, polycarbonate or other material as noted above, and are secured together by their edges. Any suitable means of quick, efficient securement may be employed, one connection system being indicated in FIG. 7. As shown in FIG. 7, some of the panels may have a slotted arrangement at their edges, to receive an adjacent panel. Thus, the left side panel 32 may include at its back edge a pair of adjacent but spaced apart flanges 40 and 42, forming a vertical channel or slot into which the left edge of the back panel 42 is inserted and fairly closely fitted. Similarly, the back edge of the right panel 36 may include a pair of channel-forming flanges 40 and 42, forming a vertical channel or slot which faces to the left for receiving the right edge of the back panel 34 as illustrated. Alternatively, the back panel 34 could simply have forwardly-facing flanges 40 and 42 at each side, both facing forward, for receiving non-flanged edges of both the left and right side panels 32 and 36, but the FIG. 7 arrangement is preferred to restrain the side panels from pulling forward.

In FIG. 7 the top panel 38 is not shown. That panel may include similar flanges as in FIG. 7 to form channels for engaging over the top edges of the left, rear and right panels 32, 34 and 36 when placed thereon. These flanges may terminate short of the back left and right corners, so that they do not interfere with the vertically oriented flanges 40 and 42 on the rear panel 34 and/or the side panel 32 or 36. Alternatively, the flanges 40 and 42 of the rear or side panels could be truncated to less than full height to avoid flange to flange interference.

The channels formed by these flanges provide for quick erection and dismantling of the tile saw shield.

The channel-forming flanges 40 and 42 can simply comprise linear acrylic moldings secured to the surfaces of the flat panels, as by solvent bonding.

As another preferred form of panel connection, an extrusion 50 such as shown in FIG. 9 can be used for holding the panels together at their edges. Such an extrusion 50, formed of relatively hard plastic or of a rubbery plastic material and having channels 52 at right angles, is engaged onto the edges of certain panels, such as the top panel and the back edges of the left and right side panels, preferably permanently as by solvent bonding. The extrusions are then engaged over the adjacent panel edge as the tile saw shield is assembled. Five lengths or strips of the extrusion are used for the assembly shown. The extrusion 50 allows quick dismantling of the tile saw shield assembly, with each strip preferably remaining on one or the other of the adjacent panel edges.

In another embodiment of edge connection (not shown), some of the panels may simply have a right angle bend at an edge for engagement over an adjacent panel edge. Three edges of the top panel can be angled. The resulting assembly, however, tends to be less stable than the assemblies described above.

As noted above, some of the panels could alternately be hinged together at edges (not shown). The hinges can simply be bendable plastic hinges, continuous through the length of an edge. They can be applied, for example, at side to back panel connections. The top panel could also be hinged from one of the other panels. Hinging is limited by the ability to insert panels around saw structure, and may be more appropriate for saws other than the type illustrated.

Figure 6:
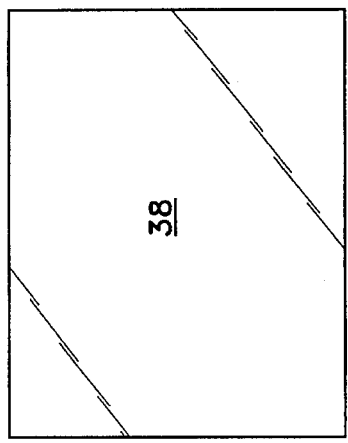

FIG. 8 illustrates, somewhat schematically, an important feature of the invention. All of the four shield panels 32–36 are dimensioned so as to fit within the confines of the perimeter lip or wall 26 of the liquid containing tray 12. The panels are shown stacked in the tray in FIG. 8, with the motor/blade assembly removed (this and other types of tile saw provide for lifting the tray off the frame, and separation of the motor/blade assembly from the frame). The height of the tile saw shield, i.e. the side and back panels, is such that all three of these panels fit between the lips 26 at left and right of the liquid tray. The top panel 38 may have a width sufficiently narrow to fit within the tray, depending on the type of edge securement used, but in any event its length is preferably less than its width, as shown in FIG. 6, so that it can easily be turned at right angles to its erected position for stacking in the tray. With the four panels stacked in the tray, the shield is easily and compactly stored and transported along with the saw apparatus, requiring no additional bulk and little additional weight.

Figure 5:
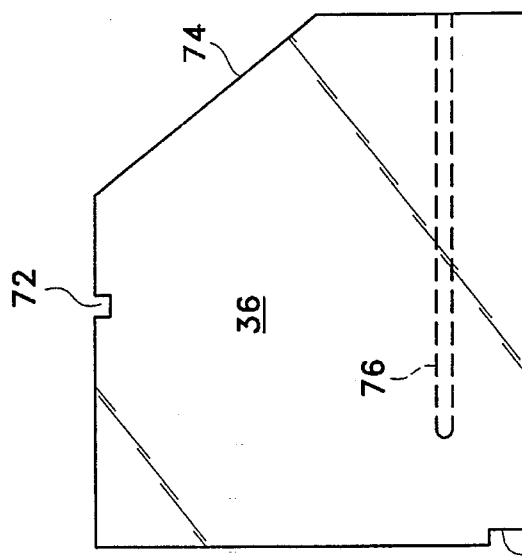
FIG. 3, 4, 5 and 6 are plan views showing unassembled left, rear, right and top panels in accordance with one embodiment of the tile saw shield, for a specific type of tile saw, all panels being viewed at their inside surfaces.
Figure 4:
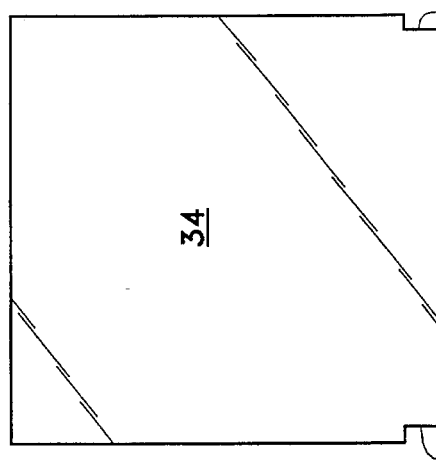
Figure 3:
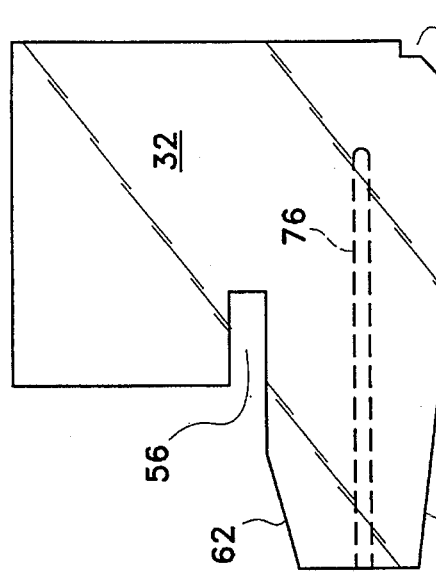

As indicated in FIG. 3, 4 and 5, the side and back panels may be somewhat irregular in shape, to accommodate various features of the liquid bath tray or of other structural features of the tile saw. For example, the left side panel 32 (its inside surface is shown in FIG. 3) may include a slot 56 for accommodating a structural support bar 58 which supports the motor and blade assembly 60, as seen in FIG. 2. Also, edges at 62 and 64 may be slightly angled, to allow this panel to be inserted under the support bar 58, which requires an initial tilt to permit the insertion. Also, FIGS. 3–5 show rear corner cut outs 66, 68 and 70 at the bottom corners of the side and back panels. These are to accommodate the shape of the liquid bath tray 12, which, as shown in FIG. 8, typically has a radius at each corner. The notch 66 is shown as including an angled cut for ease of assembly of the shield into the tray. Further, a notch 72 may need to be provided at the top edge of one of the panels, such as the right side panel 36 shown in FIG. 5, to accommodate an electrical cord 74 (FIG. 1) extending from the motor. All interior corners of notches and cutouts preferably have a small radius. The right panel 36 is shown with an angled edge 74, simply because it extends farther to the bottom than at the top panel. This and other edges could be curved rather than straight. FIGS. 3 and 5 also show in dashed lines an optional elongated slot-shaped cutout 76 in both side panels, which may be provided to accommodate wider tiles than the spacing between the two side panels. The dashed lines indicate this as an optional feature.

Figure 10:
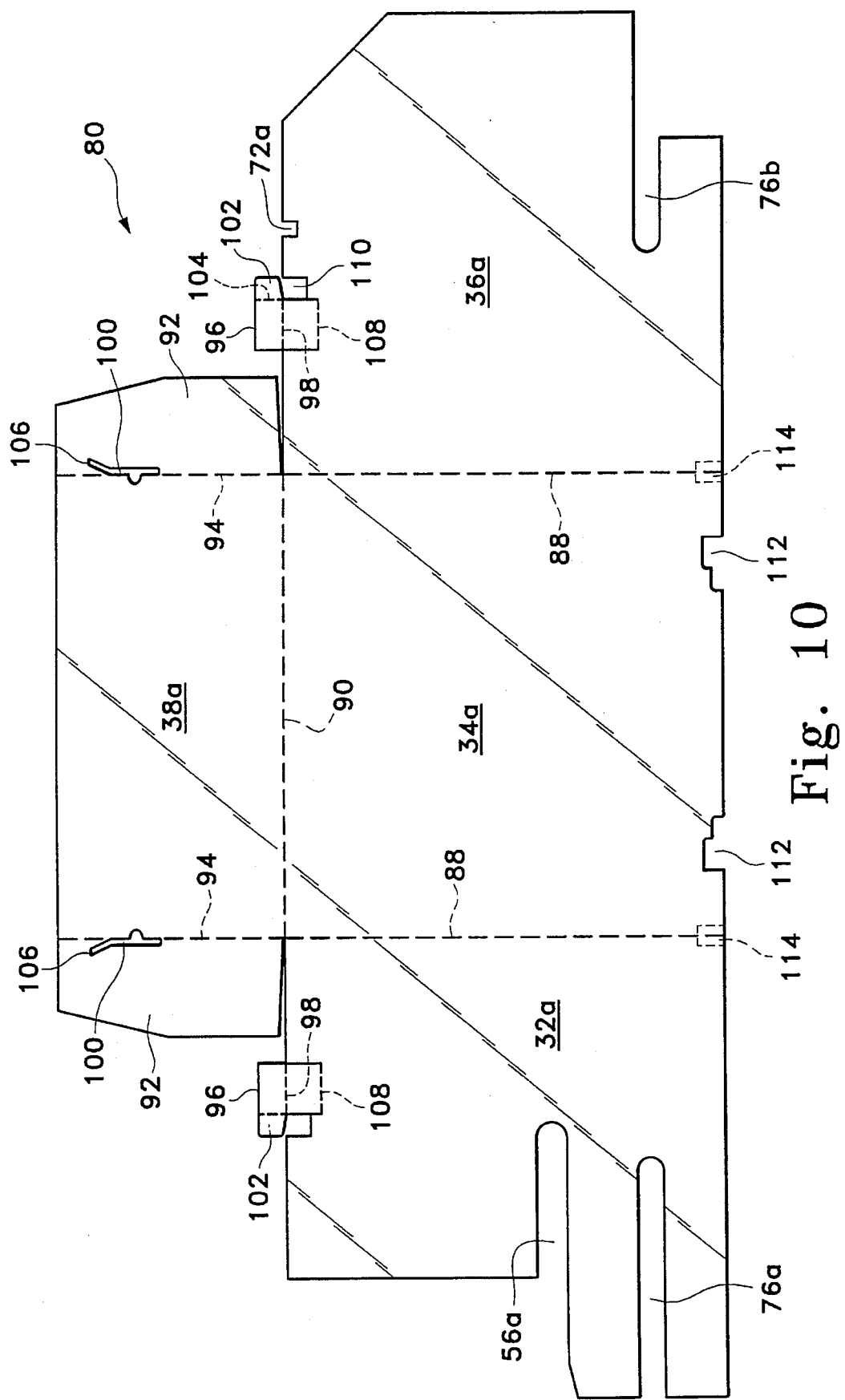
FIG. 10 is a plan, flat and non-erected view showing another embodiment of the invention, constructed as a one-piece, lightweight, foldable, economy version of a tile saw shield but similar in function to that of FIGS. 1–9.

FIGS. 10–12 show another embodiment of a tile saw shield in accordance with the principles of the invention. The tile saw shield 80 of FIGS. 10–12 is of one-piece construction, with fold lines shown dashed. The tile saw shield 80 of this embodiment preferably is formed of a "corrugated" plastic material such as illustrated somewhat schematically in the fragmentary view of FIG. 12. One example of this translucent material is formed of polypropylene and is approximately ⅛ inch thick. A similar material is used in portable mail buckets used by the U.S. Postal Service. As seen in FIG. 12, the "corrugated" plastic material 82 includes a pair of parallel sheets 84 and 85 of the plastic film material such as polypropylene, with a series of spacers 86 bridging between the outer sheets and bonded to the outer sheets. This material simulated the construction of corrugated kraft paper, i.e. "cardboard" carton material, but the plastic components may not involve actual corrugation but merely fusing together of the spacer strips 86 with the upper and lower film sheets 84 and 85.

In a related embodiment, carton-type cardboard, i.e. corrugated kraft paper, can be used for the shield 80, with the surfaces of the material treated for some degree of water resistance.

As can be seen from the drawings, the tile saw shield 80 of the invention includes, in one piece, a back panel 34a, a left panel 32a, a right panel 36a and a top panel 38a which is somewhat abbreviated from the panel 38 shown in the earlier embodiment. The one-piece shield 80 is folded along left and right vertical fold lines 88 to bring the side panels 32a and 36a substantially into perpendicular relationship with the plane of the back panel 34a. Fold lines can be pre-formed by scoring to partially flatten the material along these lines. The top panel 38a is folded downwardly, in the forward direction in which the side panels extend, along a horizontal fold line 90. Preferably prior to this step a pair of left and right side flaps 92 are folded inwardly, downwardly relative to the central portion of the top panel 38a, so that these flaps can be tucked, at right angles to the top panel 38a, into the interior of the enclosure formed by the side and top panels, as better seen in the perspective view of FIG. 11. Fold lines 94 are shown for the inward folding of the side flaps 92.

For locking of the assembly into the configuration shown in FIG. 11, tabs 96 are formed in the upper edge of each of the side panels 32a and 36a. These tabs have fold lines at 98 for bending the tab at approximately 90° to be pushed into a slot 100 formed in each of the side flaps 92 substantially where they meet the top panel. The tabs also include a foldable outer extension 102, which is bent slightly at a fold line 104, for extending into an angled extension portion 106 of each of the slots 100. Once the tabs have been inserted into the slots, these extensions 102 tend to straighten somewhat, locking the tabs 96 into the slots.

As shown in the drawing, a further fold line 108 may be included at the base of each of the assembly tabs 96. This allows the entire tab to bend from the fold lines 108, to assist the user in assembling the tabs into the slots. Further, there may be included a notch on each side panel, adjacent to the tab at 110, for further assisting the user in assembly or disassembly of the tile saw shield, providing access to the extending end 106 of the slot 100.

FIG. 10 shows that the lightweight, corrugated plastic model 80 of tile saw shield invention may include certain cutouts or slots such as in the previously described embodiment. Elongated slotted cutouts 76a and 76b may be included in the left and right side panels 32a and 36a for wider tiles, as shown. These are optional, and may be provided as solid portions with perforations in the lightweight tile saw shield, to be punched out by the user, if desired. In FIG. 11, these cutouts are shown in dashed lines, to indicate perforations which have not been punched out.

A cutout 56a is also shown in FIG. 10, in the left panel 32a. This serves the same function as the slot 56 described above relative to the first embodiment.

As seen in FIG. 10, the tile saw shield 80 also can include a notch 72a in the upper edge of the right panel 36a, for a power cord as described previously. Further, FIG. 10 shows cutouts 112 at left and right bottom of the central panel 34a, which may be included for certain models of tile saws. These cutouts 112 are needed to accommodate tile saw structure in some models (not shown). Similar cutouts can be included at the bottom edge of the center panel 34 in the embodiment 30 described above for increased applicability of that embodiment. FIG. 10 shows additional optional cutouts 114, which may be provided as perforated punch-outs, for accommodating a curved interior edge of a tile saw tray, as described previously. The provision of such perforated punch-out areas provides for convertiblity of the tile saw shield, with applicability t three or four or more variations of tile saws.

Further, the tile saw shield 80 of FIGS. 10–12 is shown with a straight outer bottom edge at the left side of the left panel 32a, but this model can include an angled edge such as shown at 64 in FIG. 3, if the shield is to be used for the same tile saw model for which the earlier embodiment 30 is principally intended.

In some models of tile saws the liquid tray (e.g. shown at 12 in FIGS. 1 and 2) has a different configuration at the inside edge leading to the bottom. For tray variations with a large depth immediately inside the edges, the bottom edges of the tile saw shields of the invention may have to be suspended by clips or hangers (not shown) which attach to the bottoms of the shield panels and to the edge of the tray.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. In combination with a tile saw having a tray with upwardly extending peripheral walls or lips, the tray carrying a liquid bath and the tile saw including a motor driven cutting blade over which the liquid passes and a movable stage on rollers facilitating movement of the stage by an operator toward and under the cutting blade to cut a tile carried on the stage, a tile saw shield positioned to substantially prevent liquid from spraying or splashing out from the tile saw and beyond the tray, comprising:

a single, integral piece of generally rigid sheet material defining a back panel, left and right side panels and a top panel, fold lines on the single piece of material forming division lines between the back panel and the side panels and between the back panel and the top panel, said fold lines being positioned to allow folding of the single piece into an erected configuration forming a rectangular partial enclosure with the side and back panels generally vertical and the top panel generally horizontal, panel securing means for retaining the tile saw shield in erected configuration, the panel securing means including means for quickly dismantling the rectangular partial enclosure for folding to a flattened configuration, and means for retaining the side and back panels in the tray at generally peripheral locations in the tray.

2. The tile saw apparatus of claim 1, wherein the piece of generally rigid sheet material is of corrugated plastic material.

3. The tile saw apparatus of claim 2, wherein the sheet material is about ⅛ inch thick.

4. The tile saw apparatus of claim 1, wherein the panel securing means comprises integral locking tabs formed on upper edges of the side panels and slot means in the top panel, positioned to receive the tabs, without fasteners.

5. The tile saw apparatus of claim 4, wherein the top panel includes a pair of side flaps with fold lines dividing the side flaps from a central portion of the top panel, each side flap having one of said slot means adjacent to a fold line which divides the central portion from the side flap.

6. The tile saw apparatus of claim 1, wherein the sheet material is translucent.

7. The tile saw apparatus of claim 1, wherein the side and top panels are of sizes to extend less than to the front of the tray, leaving space for an operator to conveniently operate the tile saw.

8. The tile saw apparatus of claim 1, wherein the means for retaining the side and back panels in the tray comprises the sizing and positioning of the side and back panels such that bottom edges of the side and back panels rest in the tray just inside upwardly extending walls or lips of the tray.

9. The tile saw apparatus of claim 1, wherein the piece of generally rigid sheet material has perforated punch-outs at edges, allowing for applicability of the tile saw shield to a range of different tile saw structures.

10. A shield for a tile saw having a tray carrying a liquid bath and having a motor driven cutting blade over which the liquid passes as fed by a pump, the shield being positioned to substantially prevent liquid from spraying or splashing out from the tile saw and beyond the tray, comprising:

a single, integral piece of generally rigid sheet material defining a back panel, left and right side panels and a top panel, fold lines on the single piece of material forming division lines to differentiate the back panel, the side panels and the top panel, said fold lines being positioned to allow folding of the single piece into an erected configuration forming a rectangular partial enclosure with the side and back panels generally vertical and the top panel generally horizontal, the enclosure being fitted to sit within said tray, and panel securing means for retaining the tile saw shield in erected configuration, the panel securing means including means for quickly dismantling the rectangular partial enclosure for folding to a flattened configuration.

11. The tile saw apparatus of claim 10, wherein the piece of generally rigid sheet material is of corrugated plastic material.

12. The tile saw apparatus of claim 11, wherein the sheet material is about ⅛ inch thick.

13. The tile saw apparatus of claim 10, wherein the panel securing means comprises integral locking tabs formed on upper edges of the side panels and slot means in the top panel, positioned to receive the tabs, without fasteners.

14. The tile saw apparatus of claim 13, wherein the top panel includes a pair of side flaps with fold lines dividing the side flaps from a central portion of the top panel, each side flap having one of said slot means adjacent to a fold line which divides the central portion from the side flap.

15. The tile saw apparatus of claim 10, wherein the sheet material is translucent.

16. The tile saw apparatus of claim 10, wherein the piece of generally rigid sheet material has perforated punch-outs at edges, allowing for applicability of the tile saw shield to a range of different tile saw structures.

* * * * *